United States Patent [19]
Campbell

[11] 3,967,594
[45] July 6, 1976

[54] ROTARY POWER UNIT

[76] Inventor: Donald K. Campbell, Underwood, Wash. 98651

[22] Filed: Jan. 27, 1975

[21] Appl. No.: 544,397

[52] U.S. Cl. .............................. 123/8.45; 418/61 A
[51] Int. Cl.² .................................. F02B 55/14
[58] Field of Search .................. 123/8.45, 8.01; 418/61 A; 74/804

[56] References Cited
UNITED STATES PATENTS

| | | | |
|---|---|---|---|
| 3,213,714 | 10/1965 | Hejj | 418/61 A |
| 3,285,189 | 11/1966 | Doyer | 123/8.45 X |
| 3,311,094 | 3/1967 | Kehl | 123/8.45 |
| 3,410,254 | 12/1968 | Huf | 123/8.45 |
| 3,413,961 | 12/1968 | Keylwert | 123/8.45 X |
| 3,514,236 | 5/1970 | Rashev | 123/8.45 X |
| 3,760,777 | 9/1973 | Leroy | 123/8.45 |
| 3,799,705 | 3/1974 | Gunthard | 123/8.45 |
| 3,800,760 | 4/1974 | Knee | 418/61 A |
| 3,875,905 | 4/1975 | Duguetle | 123/8.45 |

Primary Examiner—Clarence R. Gordon
Attorney, Agent, or Firm—Emory L. Groff, Jr.

[57] ABSTRACT

A rotary engine includes a tri-lobular casing provided an elliptical piston having two opposite faces alternately cooperating to define one of three firing chambers with a segment of the casing wall. Gearing and eccentric means supporting the piston within the casing and connected to side plates translate the location of the center axis of the piston 120° relative the center of the casing during each firing stroke thereof as one nose of the piston travels a distance substantially three times that of the opposite nose whereby six firing strokes take place during each 360° revolution of the piston.

8 Claims, 9 Drawing Figures

ROTARY POWER UNIT

This invention relates generally to a rotary engine and more particularly to an improved rotary power unit including an elongated piston disposed within a tri-lobular casing and provided with unique gearing components producing a more efficient relative movement therebetween.

The adaptability of rotary power units for mass use is now acknowledged and the advantages of a rotary engine versus a reciprocating engine are now well established. The present unit offers a further advancement of the art by providing a relatively simple, light-weight, high compression power assembly wherein a single piston, during one revolution of an appropriate output shaft connected thereto, is transmitting power during at least 200° of the 360° of each shaft revolution, an improvement over many known rotary engines and a substantial increase over a conventional four-stroke engine with a maximum power stroke of 90°. The high compression rating of the instant power unit produces a greater power output than many prior forms of rotary engines and readily lends itself to operation with diesel fuel.

A problem area confronted in producing many of the earlier rotary engines involved the difficulty in maintaining an adequate seal in the area between the tips of the rotary piston and the juxtaposed chamber wall of its housing, which problem has been compounded due to the inherent operation of these engines wherein the tip ends of the piston undergo a variable speed during each revolution thereof.

The present invention seeks to alleviate the aforementioned problem by providing a construction wherein the tips of an elliptically shaped piston are substantially at all times disposed normal to the juxtaposed chamber wall, an arrangement quite unlike that of many prior known rotary power units wherein the piston tip ends are often disposed at an angle other than 90° relative the juxtaposed chamber wall during each revolution of the piston.

Accordingly, one of the objects of the present invention is to provide an improved rotary power unit comprising an elliptical rotor disposed within a tri-lobular casing and mounted therein for compound motion wherein during each revolution of the piston its center rotary axis describes a substantially triangular variable path to sequentially provide three compression and firing operations with the two tip ends of the piston being constantly maintained in engagement with the interior wall of the casing at an angle of substantially 90°.

Another object of the present invention is to provide an improved rotary power unit including an elliptical piston disposed within a tri-lobular casing and mounted for compound motion therein by means of a gear-regulated eccentric contained within the piston and which is arcuately displaced by additional gear means carried by the relatively stationary side walls of the casing.

Another object of the present invention is to provide an improved rotary power unit including an elliptical piston disposed within a tri-lobular casing and having gearing connected to the casing for producing compound motion of the piston during each revolution thereof wherein by selection of appropriate gear diameters, while maintaining a specified ratio therebetween, the configuration of the chambers as produced during revolution of the piston may be altered.

A further object of the present invention is to provide an improved rotary power unit including a rotor disposed within a casing and provided with planetary gear means attached to the casing and engaging both gear means on the rotor for imparting rotation thereto as well as engaging gear driven eccentric means within the rotor for imparting a substantially triangularly configured displacement of the center of the rotor during each revolution thereof.

Still another object of the present invention is to provide an improved rotary power unit including an elliptical rotor disposed within tri-lobular casing with the two major faces of the rotor alternately defining with the casing three firing chambers each time the rotor has rotated 180°.

Another object of the present invention is to provide an improved rotary power unit including an elliptical rotor disposed within a tri-lobular casing and provided with planetary gearing and eccentric means between the rotor and an output shaft whereby during each rotation of the rotor from one firing chamber to the next, one tip end of the rotor is displaced three times the distance of the other rotor tip end and during subsequent rotor rotation to the next adjacent firing chamber, the opposite tip ends displaying this differential displacement.

With these and other objects in view which will more readily appear as the nature of the invention is better understood, the invention consists in the novel construction, combination and arrangement of parts hereinafter more fully described, illustrated and claimed.

A practical embodiment of the present invention is shown in the accompanying drawings, in which.

Similar reference characters designate corresponding parts throughout the several figures of the drawings.

Figure 1:
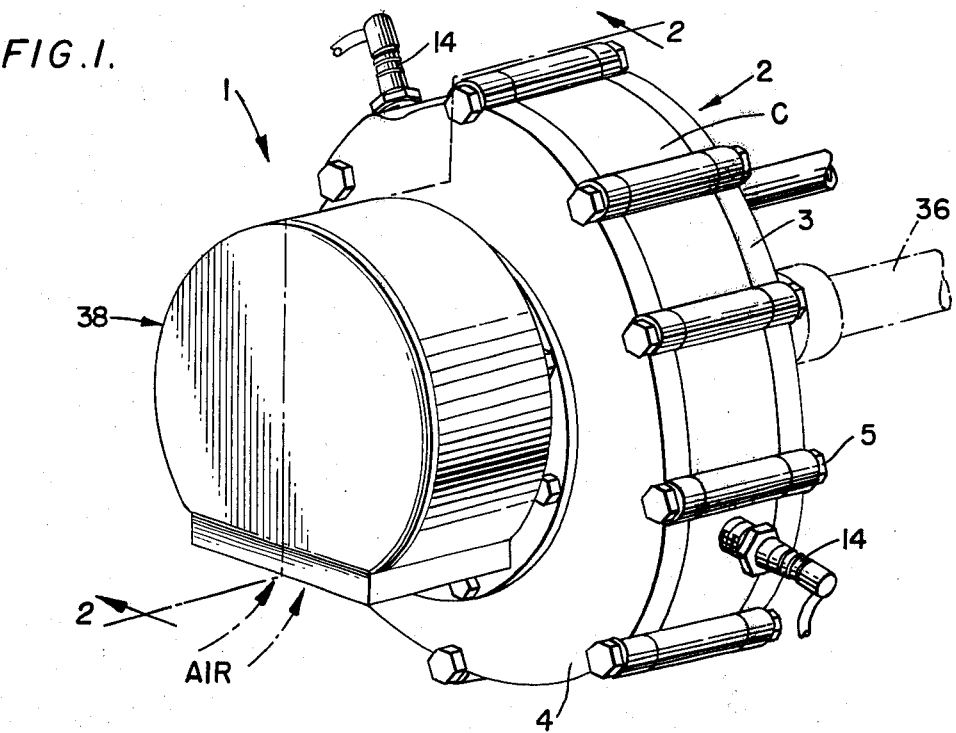
FIG. 1 is a perspective view of a rotary power unit according to the present invention.

Referring now to the drawings, particularly FIG. 1, the present invention will be seen to comprise a rotary power unit, generally designated 1, including a housing 2 having an output side plate 3 and laterally spaced apart intake side plate 4 between which is sandwiched the casing C. These side plates include respectively, planar inner faces 3' and 4'. Suitable releasable fasteners 5 pass through the components of the housing 2 to retain them in the assembled condition of this figure of the drawings.

The casing C is constructed to provide a tri-lobular configuration within its interior as shown most clearly in FIGS. 4–7 of the drawings wherein it will be seen that a continuous casing chamber wall 6 is provided having three congruent wall segments 7. A rotor or piston 8 is disposed within the interior of the casing C and will be seen to generally define an elliptical configuration having in effect a pair of piston faces 9—9 symmetrically disposed about either side of the major axis of the piston, which axis terminates at its distal portions in a pair of tip ends or noses 10—10. At this point of the description, certain relationships between the configuration of the piston 8 and casing chamber wall 6 should be understood. First, a chord subtending each chamber wall segment 7 from one lobe 11 to another lobe 11 thereof is of lesser length than the length of the major axis of the piston 8 and accordingly, since both the piston faces 9 and casing chamber wall 6 are defined by curved surfaces it will be seen that regardless of the position of the piston 8 within the casing C, there will at all times be an air chamber opposite each of the two piston faces 9—9.

Depending upon the angular displacement of the rotary piston 8, one of a plurality of three firing chambers will be serving to produce a power stroke against one face 9 of the piston, while the other face 9 thereof will be scavenging the next adjacent firing chamber of the products of combustion formed during the immediately preceding firing stroke and continued movement of the piston will cause compression of an air charge into a third firing chamber as formed by the second piston face 9 and adjacent casing wall segment 7.

Figure 4:
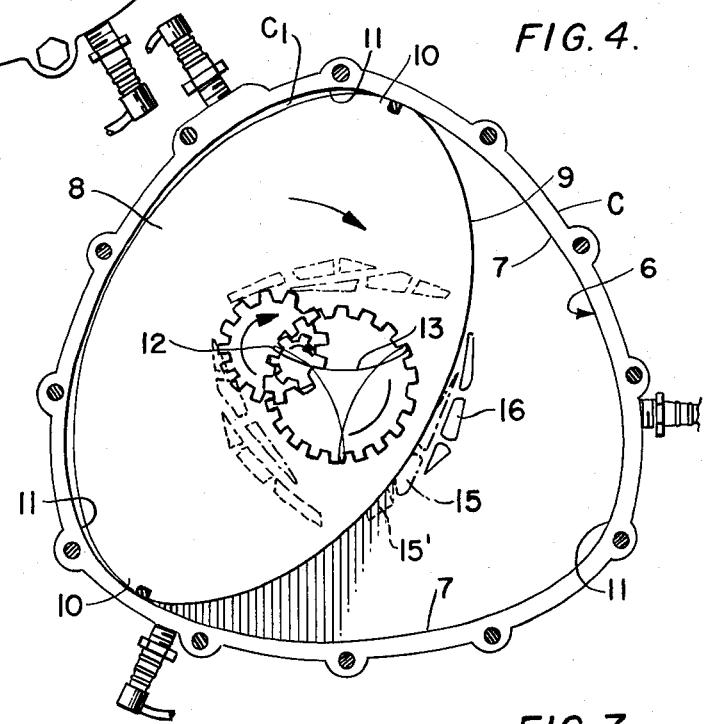
FIG. 4 is a side elevation with the side plate containing the blower assembly removed to illustrate the piston as it appears ready for the firing stroke of the upper-most chamber.

Before describing the hearing and eccentric means which permits of the above-described sequence involving the displacement of the piston 8, a review of FIGS. 4–7 will facilitate an understanding of the structure to be described hereinafter. FIG. 4 illustrates a side elevation of the housing 2 with the intake side plate 4 removed. Viewing the structure in this position, it will be understood that the piston 8 at all times rotates in a clockwise direction with a concurrent arcuate displacement of the piston center 12 along a substantially triangular path and in a counter-clockwise direction as represented by the line 13 in FIGS. 4–7 of the drawings. Considering the clockwise direction of travel of the piston 8 during its operation, it will be observed that just ahead of each of the three lobes 11 of the casing C is a fuel injector 14 for the introduction of diesel fuel by any suitable regulating means (not shown) as is well known in the art. Juxtaposed each injector 14 is an area which may be defined as a firing chamber and which is formed by the surrounding surface of the casing chamber wall segment 7 and the juxtaposed surface of the piston face 9. In the case of the relationship as depicted in FIG. 4 of the drawings, the piston 8 may be considered to be ready for a firing stroke as will be provided by the firing chamber $C_1$, it being understood that while being displaced to this position the piston 8 caused a compression of a previously admitted air charge between the space now defining the firing chamber $C_1$ so that when the structure reaches the position as shown in this figure the heat and pressure imposed upon the air and now admitted diesel fuel produces combustion at this time to drive the adjacent face 9 of the piston in a clockwise direction successively through the positions shown in FIGS. 5, 6 and 7 of the drawings.

Figure 5:
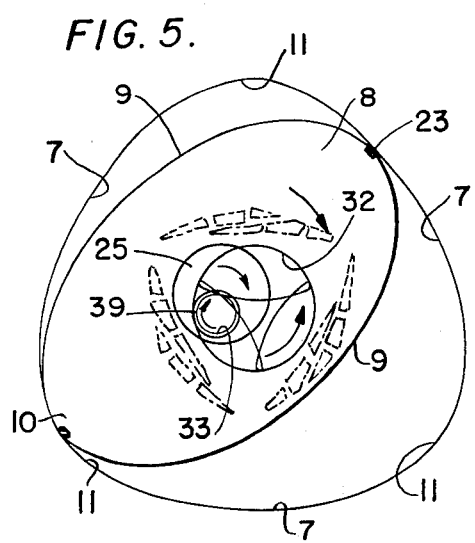
FIGS. 5–7 are side elevations diagrammatically illustrating the compound motion imparted to the piston following the firing stroke as applied to the structure of FIG. 4.
Figure 6:
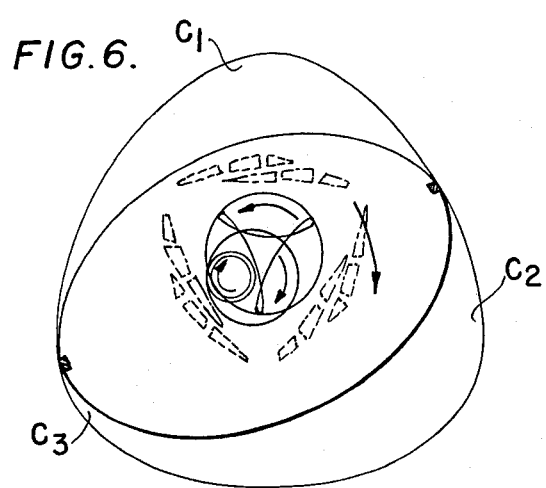

As the piston is displaced from the position shown in FIG. 4, the power applied to the left-hand piston face 9 causes the uppermost or now leading piston nose 10 to move downwardly toward the next firing chamber $C_2$ and during this initial displacement scavenging of previously burned gases from this chamber occurs as a fresh air charge is admitted through a plurality of intake ports 15 provided in the intake side plate 4, while the earlier produced products of combustion therein are ejected through a plurality of exhaust ports 16 provided in the opposite exhaust side plate 3. Although actually only the exhaust ports 16 would appear in the views of FIGS. 4–7 since the intake side plate 4 has been removed in these views, both the intake and exhaust ports have been illustrated to assist in a better understanding of the sequence of events during the operation of the present invention. Between the piston positions as shown in FIGS. 4 and 5, the right hand piston face 9 progressively passes both the intake and exhaust ports 15–16 with the piston side walls 16 providing substantially fluid-tight sealing thereof. The formation of the exhaust and intake ports is arranged to provide a progressive sealing off thereof during rotation of the piston, and it will be appreciated that the lowermost intake port 15' as shown in FIG. 4 will be the last one of the ports 15–16 to be sealed off, thereby ensuring that after scavenging of the firing chamber $C_2$ a fresh air charge will be present in the interior of the casing C below the lower face 9 of the piston. The eccentric and gear means associated with the mounting of the piston within the casing provides that during the displacement of the piston the leading-most nose 10 thereof located clockwise of the firing chamber which was last ignited, will be displaced arcuately at a speed three times that of the opposite or trailing piston nose 10. Thus it will be observed that during one stroke of the piston 8 the leading-most nose 10 describes an arc of 60° while the trailing nose 10 thereof is displaced likewise 60° yet travels a linear distance of only one-third that of the leading-most nose 10 in view of a concurrent displacement of the piston center point 12 during movement of the piston from the position of FIG. 4 to that of the position of FIG. 7. The next power stroke will occur following admission of diesel fuel by the injector 14 serving firing chamber $C_3$ so that the piston will then move from the position of FIG. 7 with the left-hand nose portion 10 thereof now becoming the leading-most nose and traveling a distance three times greater than that of the opposite or right-hand nose so that the next or third power stroke will then occur in the firing chamber $C_2$.

Although various forms of intake and exhaust ports may be provided, the illustrated arrangement has been found to serve quite satisfactorily wherein a plurality of openings are provided for both the intake of air and exhaust of burned gases. As noted, three groups of intake and exhaust ports 15, 16 are arranged equi-spaced from the center axis of the casing C with one group juxtaposed each lobe 11. In each group the intake ports 15 are disposed a shorter radius from the casing center than the exhaust ports 16 and include at least one port 15' arcuately disposed in a clockwise position beyond the trailing-most exhaust port 16.

Figure 2:
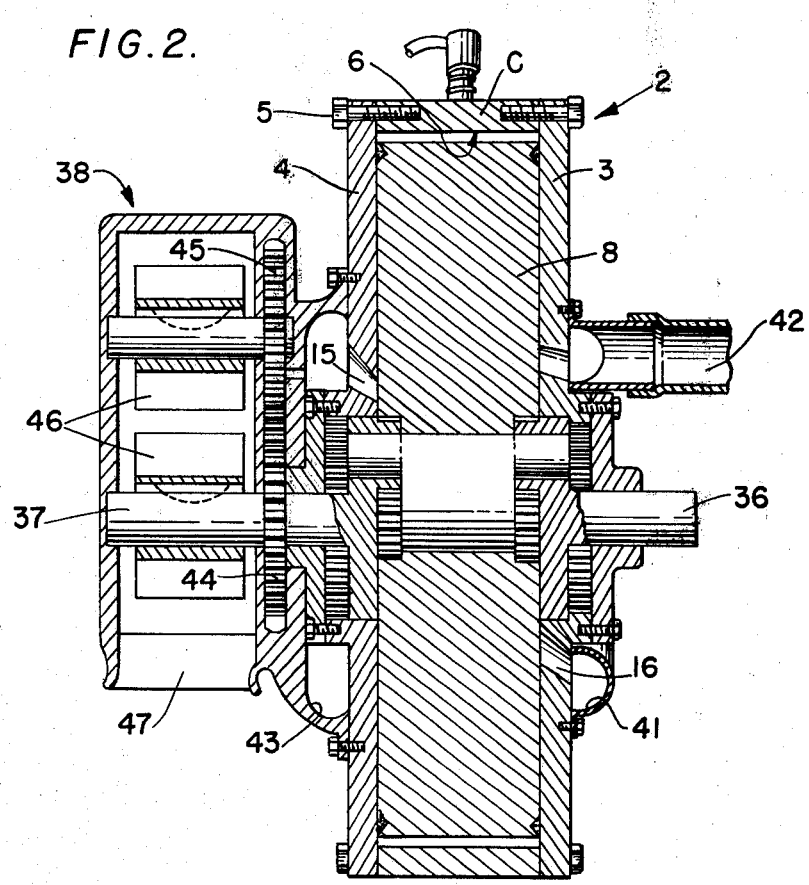
FIG. 2 is a vertical sectional view taken along the line 2—2 of FIG. 1.
Figure 3:
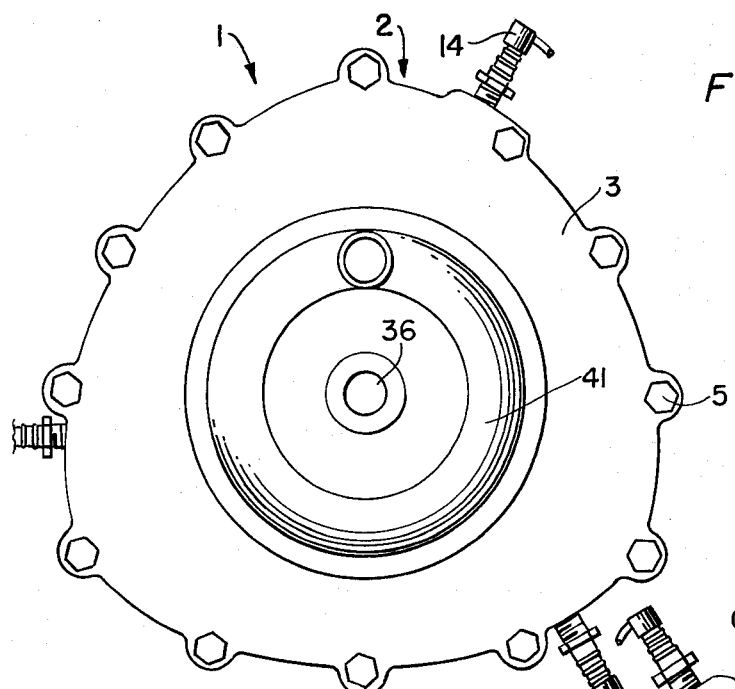
FIG. 3 is a side elevation of the rotary power unit of FIG. 1 as viewed from the side of the output shaft.
Figure 8:
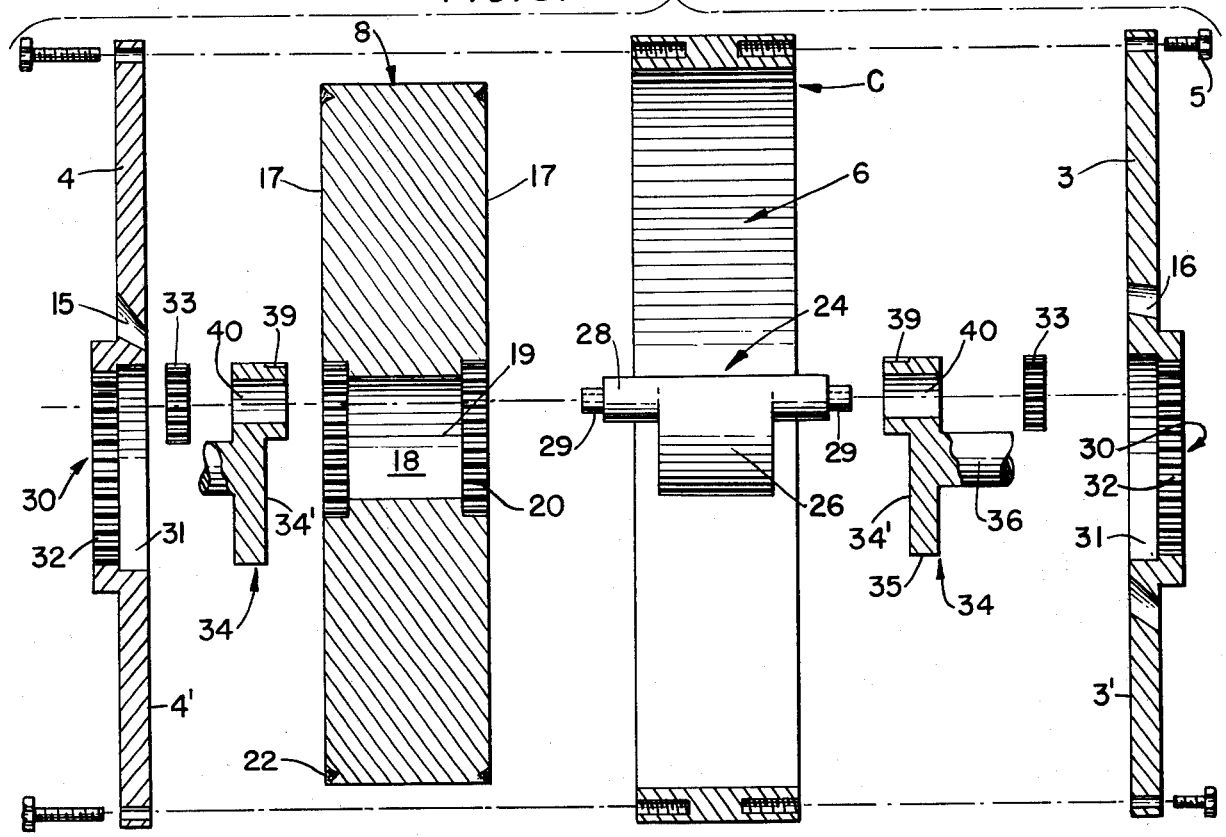
FIG. 8 is a vertical sectional view of the casing, piston and gearing arrangement as included in the assembled condition of FIG. 2.
Figure 9:
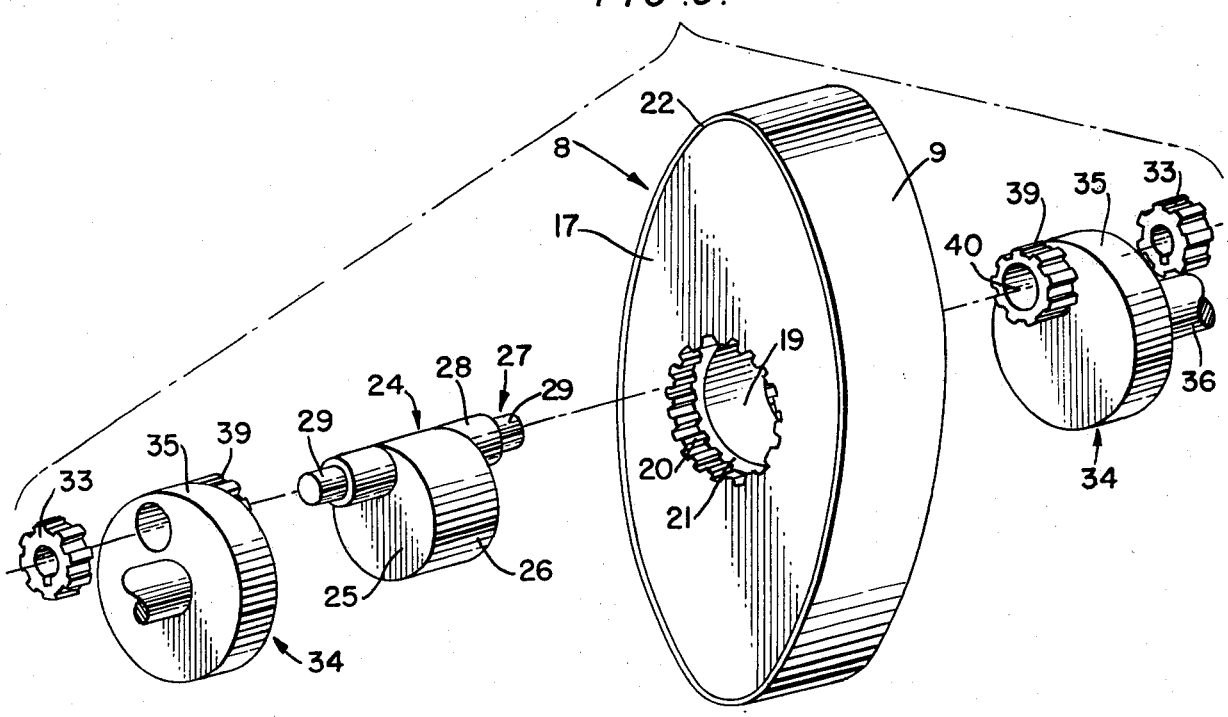
FIG. 9 is an exploded perspective view of the piston and gearing elements as shown in FIG. 8.

Turning now to the gear and eccentric means causing the above related operation, reference may be made to FIGS. 2, 8 and 9 of the drawings wherein it will be seen that the piston 8 is provided with a central transverse bore 18, the axis of which is the piston center line 12 and the cylindrical periphery of which provides a piston bearing surface 19. Disposed within the two parallel side walls 17 and concentric with the bore 18 are piston ring gears 20–20, the minor diameter of which is slightly greater than that of the bore 18 such that a shoulder 21 is provided between the edges of the bore 18 and the teeth of the piston ring gears 20. A suitable wiper ring 22 is inset into both side walls 17—17 immediately adjacent the outer periphery of the piston as defined by the faces 9 and noses 10 thereof, while an appropriate transverse seal 23 extends across each piston nose 10. Closely fitted within the confines of the piston bore 18 is a center drive cam or eccentric generally designated 24, and which includes a cylindrical body 25 having a circular outer bearing surface 26 providing a close mating fit with the piston bearing surface 19. The transverse or axial dimension of the cylinder body 25 corresponds to that of the bore 18 while projecting from the two sides of the cylinder body 25 are eccentric end drive shafts 27—27, each including a circular end drive bearing 28 and distal end drive gear stub 29.

Each of the two side plates 3 and 4 are provided with a central opening 30 bounded on the side adjacent the piston 8 by female bearing surfaces 31—31, each having a diameter greater than that of the piston bore 18, while a cam drive outer gear 32 likewise surrounds each opening 30 and is disposed in a plane outside that of the female bearing surface 31. Cooperating with the cam drive outer gear 32 is a cam drive inner gear 33 which is attached to the end drive shaft 27 of the piston center drive cam 24. The relationship between the cam drive inner gear 33 and the cam drive outer gear 32 is 1:3 for reasons which will be explained hereinafter.

The piston 8 is supported within the casing C by means of a support bearing head, generally designated 34, a pair of which are provided for attachment to each end drive bearing 28 of the center drive cam 24. Each support bearing head 34 includes a cylindrical male bearing surface 35, the diameter of which provides a close sliding fit within the female bearing surface 31 of the adjacent side plate 3 or 4 and an inner face 34'. In the case of the support bearing head 34 carried by the exhaust side plate 3, a central power drive shaft 36 is attached to the center thereof and extends outwardly from the exhaust side plate 3 as shown most clearly in FIG. 2 of the drawings. The opposite support bearing head 34 is supported in an identical manner by means of the intake side plate 4 but is provided with a centrally disposed shaft 37 serving as drive means for the blower assembly, generally designated 38.

Eccentrically provided on each support bearing head 34 is a male piston radial position gear 39 which will be understood to be integral with the bearing head and includes a central bore 40 therethrough, which bore is likewise offset with respect to the central power drive shaft 36 or blower drive shaft 37. The offset bore 40 is adapted to provide a close sliding fit about the end drive bearings 28 on either side of the center drive cam 24, while the teeth of the male piston position gear 39 mesh with the teeth of the respective piston ring gears 20 as shown in FIG. 2 of the drawings. The relationship between each male piston position gear 39 and its respective female piston position gear 20 is 1:2 for reasons which will become obvious hereinafter.

Before describing in detail the sequence of movement between the above related components, the attendant structure associated with the rotary power unit as shown in FIG. 2 of the drawings will be discussed. Surrounding all of the exhaust ports 16 formed in the exhaust side plate 3 is an exhaust manifold 41 communicating with an appropriate exhaust line 42. The previously described intake ports 15 communicate with a common intake manifold 43 and this manifold is in turn supplied with air by means of the blower assembly 38 which is driven by means of the blower drive shaft 37. The exemplary blower assembly as shown in this figure of the drawings includes a blower drive gear 44 affixed to the drive shaft 37 and meshing with a blower driven gear 45, each of these two gears in turn causing rotation of the vanes 46 to draw in air through the air intake 47 prior to directing it into the intake manifold 43.

As previously observed, each firing chamber $C_{1-3}$ in effect is disposed in an area located ahead of its respective adjacent casing lobe 10, considering that the piston 8 rotates in a clockwise direction when viewing the apparatus as in FIG. 4 of the drawings. Associated with each of these firing chambers is the separate injector 14 for supplying diesel fuel from an appropriate fuel distributing means (not shown).

Considering the components as shown in FIGS. 8 and 9 being assembled as illustrated in FIG. 2, the cooperation therebetween will be understood by following the movement thereof during one firing stroke as illustrated by displacement of the piston 8 as disclosed in FIGS. 4–7. In the illustration of FIG. 4 an air charge has been compressed into the relatively small area of the firing chamber $C_1$, at which time diesel fuel is admitted by means of the uppermost injector 14 into this firing chamber whereupon combustion thereof produces expansion of the fuel-air mixture against the adjacent casing chamber wall segment 7 and piston face 9, thereby applying a force in a downward direction upon the piston 8 to progressively displace same in the clockwise direction as shown in the succeeding FIGS. 5–7. It is important to note that the major axis 7 of the piston 8 is disposed at its closest point to the segment 7 of a particular firing chamber which is producing the firing stroke at any one time. This location of the piston is caused by the eccentric disposition of the center drive cam end drive shafts 27—27 which pass through the respective support bearing heads 34—34 at a point eccentrically disposed relative the respective drive shafts 36–37. Inasmuch as the cam drive inner gears 33 as carried by the eccentric end drive shafts 27 constantly mesh with and roll within the cam drive outer gears 32 it will follow that a trichoidal displacement of the end drive shafts 27 occurs during rotation of the piston 8 in a direction which is counter thereto, that is, the cam drive inner gears 33 describe a counter-clockwise circular movement as the piston moves in a clockwise direction.

Figure 7:
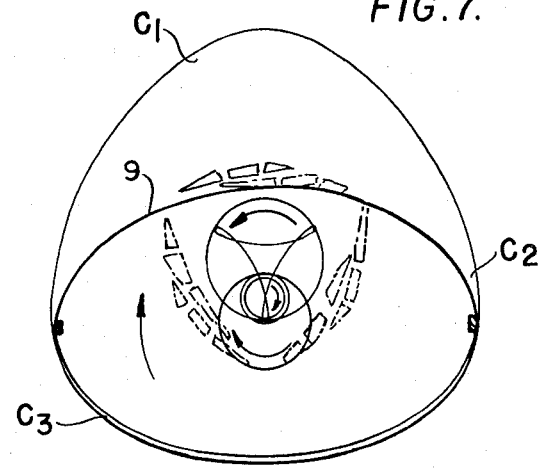

In view of the irregular or tri-lobular configuration of the casing chamber wall 6 it will be obvious that means must be provided to produce an irregular displacement of the piston center axis 12 during the rotation of the piston. This action is achieved due to the constant meshing of the male piston position gears 39 with the female piston position gears 20. Recalling that the teeth of the male piston position gears 39 are integral with the respective support bearing heads 34 and the fact that the gears 39 and 20 are selected to provide a 1:2 ratio, it will be observed that the eccentric relationship between the end drive shaft 27 and the cylindrical body 25 of the center drive cam 24 will cause a 120° displacement of the piston center 12 while only causing a 60° displacement of the longitudinal or major axis 7 of the piston 8 when comparing the relative location of the components as viewed in FIGS. 4 and 7. In the case of the structure as shown in FIG. 7, it will follow that firing chamber $C_3$ contains a fresh charge of air which is compressed and ready for the ignition of diesel fuel therein prior to the second firing stroke which will be seen to act upon the opposite piston face 9 which was acted upon during the firing stroke previously described. With the foregoing in mind, it will be observed that the firing sequence for the three firing chambers $C_{1-3}$ is one, three, two, and in view of the above described 1:2 gear ratio it will follow that six firing strokes must take place during each full 360° rotation of the piston 8.

A further important feature to note is that the uppermost nose 10 of the piston 8 which may be described as the leading nose during the power stroke of the firing chamber $C_1$, travels an arcuate distance encompassing three times the linear distance traveled by the trailing or opposite nose 10 and this action is caused by the 3:1 ratio between the cam drive outer gear 32 and cam drive inner gear 33 as carried by the end drive shaft 27. The leading and trailing noses 10 of the piston therefore alternate between succeeding firing strokes as does the face 9 of the piston which is acted upon by the expanding gases. From the foregoing it will be appreciated that the piston 8 and center cam drive cylinder body 25 revolve in a clockwise direction during firing of the chambers while the support bearing heads 34 rotate in a counter-clockwise direction and thus will rotate the center power drive shaft 36 and blower drive shaft 37 in counter-clockwise directions.

Although the subject invention has been described with reference to diesel fuel operation it will be readily apparent that gasoline may be used with the substitution of appropriate ignition and carburation devices without departing from the unique concept disclosed herein.

I claim:

1. A rotary engine including, a housing having a casing provided with a tri-lobular interior wall, a substantially elliptical piston disposed within said casing and having two curved faces terminating to provide a nose at the two distal portions of the major axis of said piston, planar side faces on said piston, said major axis of a greater length than a chord subtending any two adjacent lobes of said tri-lobular casing interior wall, said housing including two side plates having planar inner faces enclosing said piston and casing interior wall, said piston provided with a central bore bounded by a circular bearing surface, a female piston position gear formed on each side of said piston bearing surface, a center drive cam journaled within said piston bore, each said side plate including a central opening having a surrounding circular female bearing surface adjacent said piston sidewall and a cam drive outer gear outside said female bearing surface, support means including a cylindrical head journaled in each said female bearing surface and each having a planar inner face coplanar with said respective side plate face, said drive cam including integral eccentric end drive means extending laterally from both sides thereof and projecting respectively through each said support means, an eccentrically disposed male piston position gear on each said support means each journaled about one said end drive means and engaging one said female piston position gear, a cam drive inner gear carried by the projecting portion of each said end drive means on the side of said support means away from said piston and engaging said cam drive outer gear, three firing chambers defined between said casing interior wall and one of said piston faces adjacent said casing lobes, said male and female piston position gears defining a ratio of 1:2 whereby, as said piston rotates 60° from one firing chamber to another the center axis thereof is displaced 120° relative said side plate openings.

2. A rotary engine according to claim 1 wherein, said cam drive inner and outer gears define a ratio of 1:3 whereby during rotation of said piston from one said firing chamber to another one of said piston noses travels three times the distance of the other said piston nose.

3. A rotary engine according to claim 1 including, a power drive shaft axially extending from one said support means whereby, said piston rotates through six of said firing chambers for each 360° revolution of said piston.

4. A rotary engine according to claim 1 including, means for admitting air and a combustible fuel into each said firing chamber and for removing spent products of combustion therefrom.

5. A rotary engine according to claim 1 including, a blower drive shaft axially extending from one said support means, a blower assembly driven by said drive shaft and means communicating between said blower assembly for delivering air to each of said firing chambers.

6. A rotary engine according to claim 4 wherein, said air admitting means includes intake ports through at least one said sidewall and said removing means includes exhaust ports through at least one said side wall.

7. A rotary engine according to claim 6 including three groups of a plurality of said intake and exhaust ports.

8. A rotary engine according to claim 6 wherein, said intake ports are radially spaced from the center axis of said casing a lesser distance than said exhaust ports.

* * * * *